United States Patent
Perez

(10) Patent No.: US 10,221,816 B2
(45) Date of Patent: Mar. 5, 2019

(54) HYBRID VEHICLE WITH A LIQUEFIED LIGHT HYDROCARBON OR HYDROGEN FUEL SYSTEM AND METHODS THERETO

(71) Applicant: Alberto Martin Perez, Houston, TX (US)

(72) Inventor: Alberto Martin Perez, Houston, TX (US)

(*) Notice: Subject to any disclaimer, the term of this patent is extended or adjusted under 35 U.S.C. 154(b) by 13 days.

(21) Appl. No.: 15/709,093

(22) Filed: Sep. 19, 2017

(65) Prior Publication Data

US 2018/0128211 A1   May 10, 2018

Related U.S. Application Data

(63) Continuation of application No. 14/191,164, filed on Feb. 26, 2014, now Pat. No. 10,087,896, which is a
(Continued)

(51) Int. Cl.
*F02M 31/12*    (2006.01)
*F02M 31/125*   (2006.01)
(Continued)

(52) U.S. Cl.
CPC ...... *F02M 31/125* (2013.01); *F02M 21/0212* (2013.01); *F02M 21/0245* (2013.01); *F02M 21/0287* (2013.01); *F02M 21/06* (2013.01); *F04B 15/08* (2013.01); *F17C 5/02* (2013.01); *F17C 9/02* (2013.01); *F17C 13/001* (2013.01); *F04B 2015/0822* (2013.01); *F17C 2221/033* (2013.01); *F17C 2223/0161* (2013.01);
(Continued)

(58) Field of Classification Search
CPC ........... F02M 21/0212; F02M 21/0245; F02M 21/0287; F02M 21/06; F04B 2015/0822; F17C 2221/033; F17C 2223/0161; F17C 2227/0393; F17C 5/02; F17C 9/02; H01M 2250/20; H01M 2250/405
See application file for complete search history.

(56) References Cited

U.S. PATENT DOCUMENTS

| 4,277,949 A * | 7/1981 | Longsworth | F17C 3/085 |
| | | | 165/104.34 |
| 5,067,447 A * | 11/1991 | Iwaki | B60K 15/03006 |
| | | | 123/3 |

(Continued)

OTHER PUBLICATIONS

180710 NFCRC_ Fuel Cells Explained_ Fuels for Fuel Cells.*

*Primary Examiner* — Stephen K Cronin
*Assistant Examiner* — Carl C Staubach

(57) ABSTRACT

A hybrid vehicle comprising a liquefied light hydrocarbon or hydrogen (LLH) fuel system is disclosed. The fuel system comprises an insulated fuel tank having a buffer space containing vaporized fuel, an orifice plate and a fuel coil conveying a first fuel vapor to a buffer tank through a first solenoid valve; a fuel line conveying a second fuel vapor through a second solenoid valve to the buffer tank and a pressure regulator, wherein an outlet to the buffer tank connects to the pressure regulator and wherein an outlet of the pressure regulator is adapted to connect to a fuel inlet to an energy conversion device selected from the group of fuel cells, Stirling engines and internal combustion engines. Methods of using the hybrid vehicle are also disclosed.

19 Claims, 7 Drawing Sheets

Related U.S. Application Data continuation of application No. 14/052,267, filed on Oct. 11, 2013, now abandoned.

(60) Provisional application No. 61/713,587, filed on Oct. 14, 2012.

(51) Int. Cl.

| | |
|---|---|
| *F02M 21/06* | (2006.01) |
| *F17C 9/02* | (2006.01) |
| *F02M 21/02* | (2006.01) |
| *F17C 5/02* | (2006.01) |
| *F17C 13/00* | (2006.01) |
| *F04B 15/08* | (2006.01) |

(52) U.S. Cl.
CPC .......... *F17C 2227/0369* (2013.01); *F17C 2227/0372* (2013.01); *F17C 2227/0374* (2013.01); *F17C 2227/0379* (2013.01); *F17C 2227/0381* (2013.01); *F17C 2227/0383* (2013.01); *F17C 2227/0386* (2013.01); *F17C 2227/0393* (2013.01); *H01M 2250/20* (2013.01); *H01M 2250/405* (2013.01); *Y02B 90/16* (2013.01); *Y02T 10/126* (2013.01); *Y02T 10/32* (2013.01); *Y02T 90/32* (2013.01)

(56) References Cited

U.S. PATENT DOCUMENTS

| | | | | |
|---|---|---|---|---|
| 5,305,714 | A * | 4/1994 | Sekiguchi | F02B 43/08 123/3 |
| 5,540,208 | A * | 7/1996 | Kikutani | F02B 43/00 123/518 |
| 6,422,001 | B1 * | 7/2002 | Sherman | B60K 6/46 180/65.1 |
| 8,095,294 | B1 * | 1/2012 | Griffiths | F02D 35/024 123/525 |
| 10,087,896 | B1 * | 10/2018 | Perez | F04B 15/08 |
| 2007/0159007 | A1 * | 7/2007 | King | B60L 11/1864 307/71 |
| 2007/0193717 | A1 * | 8/2007 | Turini | F02M 21/06 165/43 |
| 2010/0095937 | A1 * | 4/2010 | Hudak | F02M 25/0872 123/519 |
| 2012/0060935 | A1 * | 3/2012 | Carter | F02M 21/0212 137/14 |
| 2017/0120745 | A1 * | 5/2017 | Kim | B60K 15/03519 |
| 2017/0159611 | A1 * | 6/2017 | Porter | F02M 21/0239 |

\* cited by examiner

HYBRID VEHICLE WITH A LIQUEFIED LIGHT HYDROCARBON OR HYDROGEN FUEL SYSTEM AND METHODS THERETO

CROSS-REFERENCE TO RELATED APPLICATIONS

The present application is a continuation of U.S. patent application Ser. No. 14/191,164 filed on Feb. 26, 2014, which is a continuation of U.S. patent application Ser. No. 14/052,267 filed on Oct. 11, 2013, which claims priority to U.S. Provisional Patent Application No. 61/713,587, filed on Oct. 14, 2012, for "Liquefied Light Hydrocarbon Fuel System for Hybrid Vehicle."

TECHNICAL FIELD

The present invention relates to a liquefied light hydrocarbon (LLH) fuel system for a hybrid vehicle and methods thereto.

BACKGROUND OF THE INVENTION

Light hydrocarbons (e.g., natural gas) are abundant in North America. In 2010, the U.S. Energy Information Administration (EIA) estimated the U.S. light hydrocarbon reserves to be about 317 trillion cubic feet. Recent developments in light hydrocarbon production have made light hydrocarbons more economical as an energy source than other petroleum oil products (e.g., gasoline, diesel fuel). Moreover, light hydrocarbons are environmentally cleaner than other petroleum fuels because light hydrocarbons produce fewer greenhouse gases (e.g., carbon dioxide, methane).

For use as a fuel, light hydrocarbons may be cooled to below their boiling point temperature to form liquefied light hydrocarbons (LLH). For example, the boiling point of non-compressed methane is about $-164°$ C. or $-263°$ F. at atmospheric pressure. Prior art attempts to deal with various challenges related to using a LLH fuel for vehicles powered by an internal combustion engine, such as the following: 1) insulating the LLH fuel from ambient heat; 2) vaporizing the LLH fuel before it enters a combustion chamber of the internal combustion engine; 3) providing enough LLH fuel to the internal combustion engine for sudden surges in demand for power (e.g., acceleration, high speeds, heavy loads); 4) avoiding excessive pressure-build-up inside the fuel tank from evaporation of the LLH fuel; and 5) minimizing emissions of greenhouse gases, especially vapor LLH fuel into the atmosphere when the vehicle is idle.

U.S. Pat. No. 5,373,700 describes a system for storing liquefied natural gas (LNG) and delivering vaporized LNG to an internal combustion engine. The system comprises an LNG fuel tank, a plurality of heat exchangers and gas regulator valves to maintain and control pressure inside the LNG fuel tank.

U.S. Pat. No. 5,884,488 describes a high-pressure LNG fuel system comprising an LNG fuel tank with a plurality of chambers, a cryogenic pump and an engine coolant-heated vaporizer to deliver vaporized LNG fuel to an internal combustion engine at about 3000 psig.

U.S. Pat. No. 6,698,211 describes a high-pressure LNG fuel system comprising a fuel tank, a pump and a vaporizer to deliver vaporized LNG fuel to the engine injectors at about 500 to about 3000 psig.

U.S. Pat. No. 6,058,713 describes a high-pressure LNG fuel system comprising a high-pressure fuel tank and a vaporizer using a high-pressure fuel tank to store the LNG at about 150 psi to about 1100 psi and to deliver the vaporized LNG fuel to the engine injectors at an adequate pressure.

The fuel systems described above tend to be complex, heavy, and difficult to maintain and require specialized components and materials to withstand cryogeme temperatures (e.g., cryogenic pumps, regulator valves, evaporators).

Thus, a LLH fuel system and method is needed that would be simple, light-weight, easy to maintain and utilize predominately standard components and materials.

SUMMARY OF THE INVENTION

The present invention relates to a LLH fuel system for a hybrid vehicle and methods thereto. The novel LLH fuel system addresses the challenges related to using a LLH fuel for vehicles powered by an internal combustion engine.

The first challenge involves insulating the LLH fuel from ambient heat. In other words, the LLH fuel must be maintained at a low temperature to minimize evaporation in a fuel tank. In general, Dewar-type fuel tanks with a double wall and a vacuum chamber between the two walls are required to maintain the low temperature as seen in the prior art. The present invention allows the use of a tank with a single wall covered by insulation and a radiant barrier. Although this may result in more ambient heat leakage into the tank, this incremental heat may be offset by a mechanism to extract heat from the tank and by the electronically-controlled extraction of vaporized fuel for consumption by an internal combustion engine.

The second challenge involves vaporizing the LLH fuel before delivering the vaporized LLH fuel to the combustion chamber of the engine. In the prior art, fuel extracted from the tank is vaporized by use of heat exchangers. The present invention uses ambient heat leakage to vaporize the fuel and supplements the ambient heat by a heating element to vaporize additional fuel as needed.

The third challenge involves providing enough LLH fuel to an internal combustion engine for sudden surges in demand for power (e.g., acceleration, high speed and heavy load). The prior art addresses this issue by use of a cryogenic pump to increase the flow of liquid or vapor fuel to the internal combustion engine. The present invention accommodates sudden surges in power by allowing a buffer space in the LLH fuel tank or a buffer tank to provide room for vaporized LLH fuel to accumulate at sufficient pressure to provide enough LLH fuel to the internal combustion engine.

Further, the hybrid vehicle could be configured to limit the range of operation for the internal combustion engine and to draw upon a battery to provide additional energy required for sudden acceleration, high speed and/or heavy loads.

The fourth challenge involves avoiding excessive pressure build-up inside the fuel tank from evaporation of the LLH fuel. Prior art generally addresses this issue by venting excess vaporized fuel into the atmosphere. In the present invention, the pressure may be maintained by sizing the buffer space in the LLH fuel tank or the buffer tank to be large enough to permit vaporized LLH fuel to accumulate and to be drawn without sharp variations in pressure. When the pressure in the buffer space and/or buffer tank reaches a pre-set pressure threshold, a fuel control valve could be opened and the internal combustion engine could be started to allow the engine to consume any excess vaporized LLH fuel. When the pressure in the buffer space and/or buffer tank reaches a pre-set safe level, the internal combustion engine could be shut off and the fuel control valve could be closed.

When the pressure in the buffer space and/or in the buffer tank reaches the pre-set minimum level and the internal combustion engine must continue to run, a heating system may be used to produce heat inside the LLH fuel tank. The heating system increases the evaporation rate of the LLH fuel and maintains the pressure in the fuel tank or in the buffer tank to provide enough LLH fuel to the internal combustion engine. This is especially useful when the internal combustion engine must charge the battery and/or provide additional power to an internal combustion engine.

The fifth challenge involves minimizing venting of greenhouse gases, especially vaporized LLH fuel into the atmosphere when the vehicle is idle. In the present invention, when the pressure in the fuel tank or in the buffer tank reaches a pre-set pressure threshold, the internal combustion engine could be started and a fuel control valve could be opened to allow the engine to consume any excess vaporized LLH fuel. The internal combustion engine coupled to a generator could be started to consume excess fuel and to charge the battery when the pressure in the fuel tank or buffer tank reaches a pre-set threshold. The consumption of excess vaporized LLH fuel reduces the pressure in the buffer space or in the buffer tank, eliminating the need to vent vaporized LLH fuel into the atmosphere.

If the battery reaches a full charge and the vehicle is idle for a long period, then a digital control unit could turn on a bank of resistors to draw electrical power from the battery. Although this would result in the emission of carbon oxides from fuel combustion, this has a much lower greenhouse impact than venting excess vaporized LLH fuel (e.g., methane) to the atmosphere. In addition, carbon dioxide does not represent a fire or explosion hazard while methane may ignite under certain conditions. Similar to prior art systems, the vehicle would need to be parked in a well-ventilated area to avoid accumulation of carbon monoxide, carbon dioxide or methane. As a last resort, the digital control unit could vent the excess vaporized LLH fuel to the atmosphere through a safety valve.

The LLH fuel system and methods described herein allow for a simple fuel system and eliminate the need for complex heat exchangers, cryogenic pumps, regulator valves and other mechanisms to deliver liquid fuel to the engine often seen in prior art. They also allow for a cheaper and lighter fuel tank design, and reduce the emissions of greenhouse gases as compared to prior art systems.

These and other objects, features, and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present invention, reference should be made to the following detailed disclosure, taken in conjunction with the accompanying drawings, in which like parts are given like reference numerals, and wherein.

DETAILED DESCRIPTION OF THE EMBODIMENTS

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

Liquefied Light Hydrocarbon Fuel System

Figure 1:
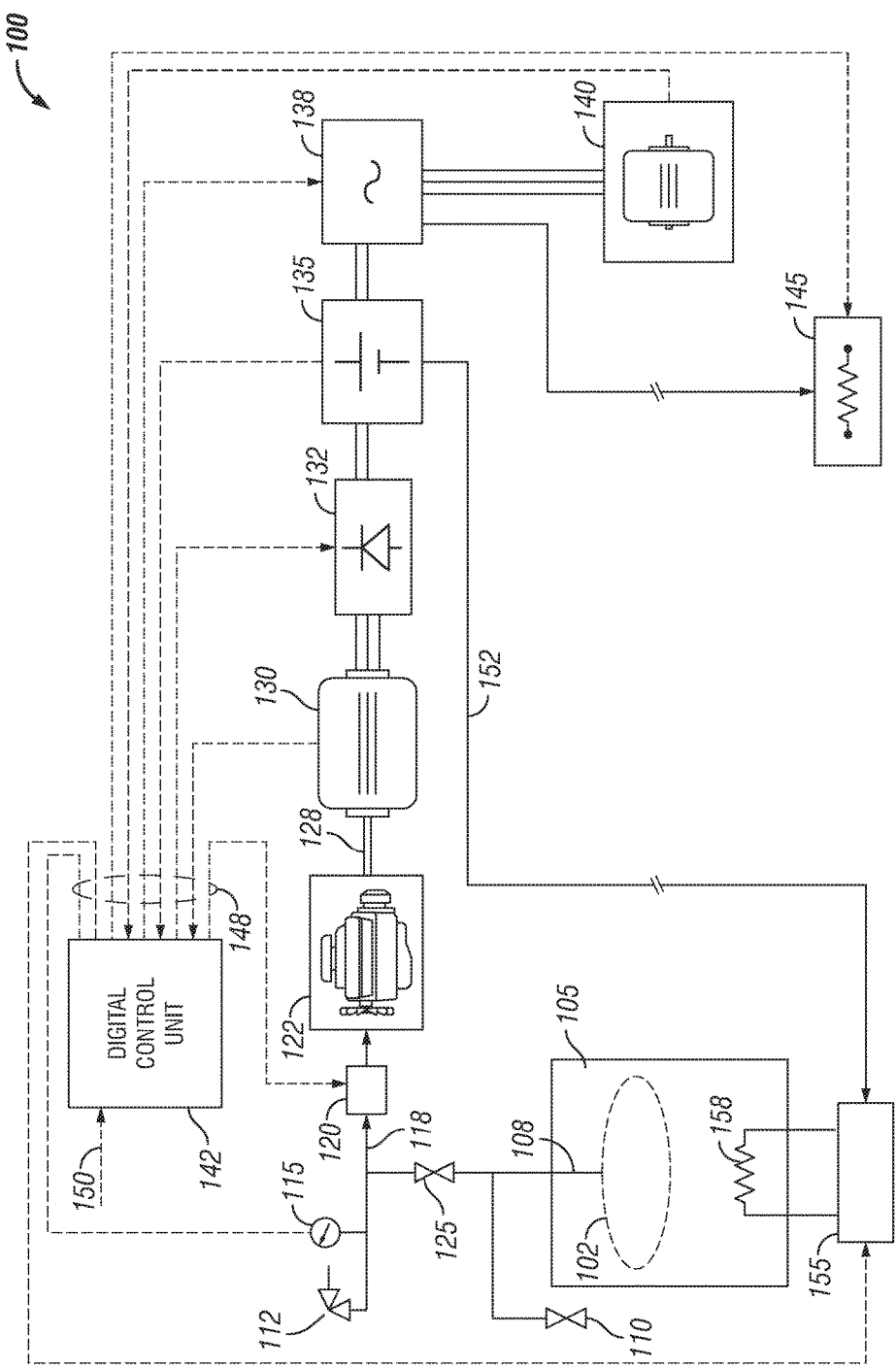
FIG. 1 illustrates a schematic of a liquefied light hydrocarbon fuel system for a hybrid vehicle according to an embodiment of the present invention.

A liquefied light hydrocarbon fuel system 100 according to an embodiment of the present invention is illustrated in FIG. 1. The fuel system 100 comprises a fuel tank 102, insulation 105 disposed around the fuel tank 102, and a fuel line 108 connected to an inlet/outlet of the fuel tank 102 and (through a fuel line 118) to an inlet of a fuel control valve 120.

As shown in FIG. 1, the fuel tank 102 is connected through a fuel line 108 to a re-fueling valve 110, a safety relief valve 112 and a pressure sensor 115. In an embodiment, the pressure sensor 115 is disposed within the fuel line 108. The pressure sensor 115 measures tank 102 pressures. In an embodiment, an inlet to the safety relief valve 112 connects to the fuel line 108. In an embodiment, when the fuel tank 102 pressure reaches a pre-set upper threshold, the safety relief valve 112 may vent vaporized LLH fuel from the fuel tank 102 to atmosphere to prevent the tank pressure from exceeding the tank 102 design limits.

In an embodiment, the fuel line 108 serves as a LLH fuel intake to refill the tank 102. An outlet of the re-fueling valve 110 is connected through the fuel line 108 to the fuel tank 102. The cold LLH fuel entering into the fuel tank 102, causes vaporized LLH fuel in the tank 102 to condense and to reduce the tank 102 pressure, allowing refilling of the tank 102. In an embodiment, a level sensor (not shown) may be disposed in the fuel tank 102 to prevent overfilling the tank 102. In an embodiment, the level sensor may be positioned to ensure a minimum buffer space in the fuel tank 102.

In an embodiment, the fuel line 108 has a first end and a second end. In an embodiment, the first end of the fuel line 108 extends into a buffer space of the fuel tank 102.

In an embodiment, the fuel line 118 has a first end and a second end. In an embodiment, the first end of the fuel line 118 connects to the second end of the fuel line 108. In an embodiment, the second end of the fuel line 108 connects to an inlet of a shut-off valve 125 and an outlet of the shut-off valve 125 connects to the first end of the fuel line 118. During re-fueling, valve 125 is closed to prevent liquid fuel from entering fuel line 118. In an embodiment, the second end of the fuel line 118 connects to the inlet of the fuel control valve 120. An outlet of the fuel control valve 120 is adapted to connect to a fuel inlet of, for example, an internal combustion engine 122. In an embodiment, the internal combustion engine 122 is a spark-plug engine. Although the combustion engine 122 is discussed in this example, this embodiment would also work with a sterling engine, a fuel cell or other similar energy conversion devices, converting chemical energy in the fuel to electrical energy and heat.

The fuel tank 102 is connected through fuel line 108 and through shut-off valve 125 to the fuel line 118. The fuel line 118 is connected to the inlet of the fuel control valve 120.

The fuel lines 108, 118 may be constructed of any suitable material. For example, the fuel lines 108, 118 may be constructed from the group consisting of aluminum, copper, steel alloy, stainless steel, rubber, braided rubber, nitrile rubber, silicon rubber and polyvinylchloride. In an embodiment, the fuel lines 108, 118 are copper.

The fuel lines 108, 118 must also have a wall thickness sufficient to handle the maximum tank 102 pressure. The fuel lines 108, 118 must have a cross-section to provide enough fuel to, for example, an internal combustion engine 122. Although the combustion engine 122 is discussed in this example, this embodiment would also work with a sterling engine, a fuel cell or other similar energy conversion devices.

Under normal operating conditions, the fuel tank 102 must contain LLH fuel at a cryogenic temperature between about −170° C. and about −120° C. and at a pressure between about 15 psi and about 300 psi. The LLH fuel may be any suitable liquefied light hydrocarbons. For example, the light hydrocarbons may be selected from the group consisting of hydrogen, methane, natural gas, ethane, ethylene, propane, isopropane, propylene, propane gas, butane, isobutane, isobutene, butylene, petroleum gas and mixtures thereof. As ambient heat leaks into the fuel tank 102 through insulation 105, the heat will cause the LLH fuel to boil and to evaporate, forming vaporized LLH fuel. In an embodiment, a LLH fuel (that is predominately methane) is typically stored at a cryogenic temperature between about −170° C. and about −120° C. inside a fuel tank at a pressure between about 15 psi and about 300 psi. In an embodiment, the LLH fuel is liquefied natural gas (LNG).

The fuel tank 102 may be constructed in any suitable shape and/or thickness for a vehicle application. For example, the shape of the fuel tank 102 may be spherical, cylindrical with hemispherical ends, toroidal or any other shape suitable for relatively high pressures. Further, the fuel tank 102 must satisfy U.S. Department of Transportation (DOT) requirements. In an embodiment, the fuel tank 102 is a cylinder with hemispherical ends.

The fuel tank 102 may be constructed from any suitable material with resistance to cold temperatures and relatively high pressures. For example, the fuel tank 102 may be constructed from the group consisting of aluminum, copper, steel alloy and stainless steel. In an embodiment, the fuel tank 102 is steel alloy.

The fuel tank 102 is insulated to protect the LLH fuel from ambient heat. In other words, the LLH fuel must be maintained at a low temperature to minimize evaporation in the fuel tank 102. The insulation 105 limits ambient heat from entering the fuel tank 102.

The insulation 105 may be any suitable material with low thermal conductivity. For example, the insulation 105 may be selected from the group consisting of supercritical-dried gels (e.g., Aerogel®, Spacetherm®), fiberglass, glass wool, wood, cardboard and polystyrene foam (e.g., Styrofoam®). In an embodiment, the insulation consists of a plurality of layers of supercritical-dried gel blankets (e.g., Aerogel® blanket, Spacetherm® blanket) surrounded by an aluminum shell.

In an embodiment, the outer surface of the insulation 105 may be covered with a highly reflective material or radiation barrier (e.g., aluminum foil) to reduce the amount of outside radiation entering the fuel tank 102.

In another embodiment, the insulation 105 may be an air gap or a vacuum chamber in a double shell, Dewar-type fuel tank 102 to limit heat conduction and convection into the tank 102. In an embodiment, the outside surface of the inner shell of the Dewar-type fuel tank 102 may be covered with the highly reflective material or radiation barrier (e.g., aluminum foil), as discussed above.

The amount and type of insulation 105 should be optimized to keep the LLH evaporation rate below a desired level. This maximum evaporation rate (i.e., boiling rate) should allow the pressure in the fuel tank 102 to be maintained below a safety limit to prevent overnight venting of vaporized LLH fuel or running the internal combustion engine 122 more than necessary to fully charge the battery 135 to consume excess vaporized LLH fuel.

Figure 2:
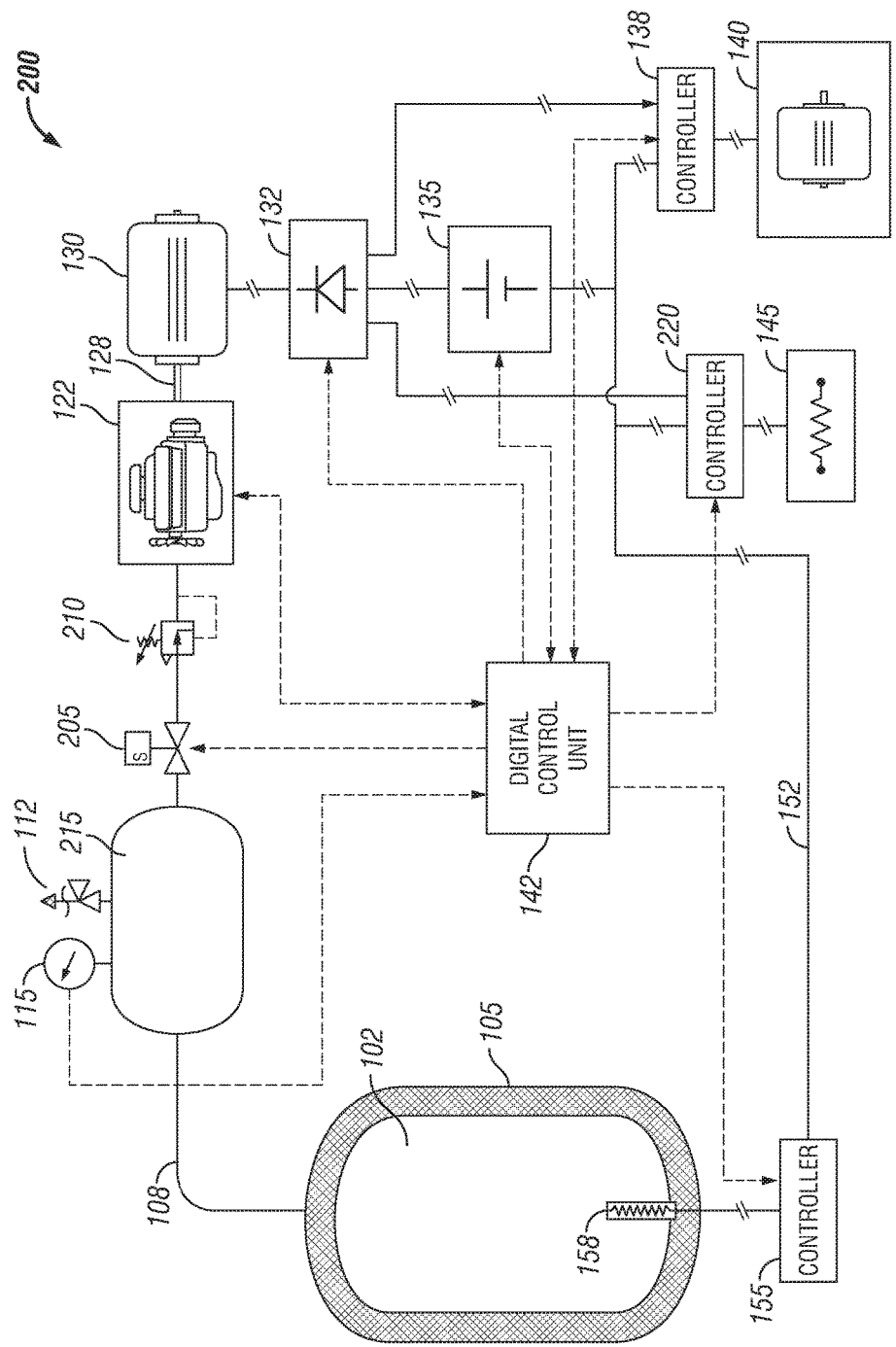
FIG. 2 illustrates a schematic of a liquefied light hydrocarbon fuel system for a hybrid vehicle according to an embodiment of the present invention.

In an embodiment, the fuel tank 102 has a tank heating system, as depicted in FIGS. 1-3. In the embodiment of FIG. 1, the tank heating system comprises a heating element 158 disposed adjacent to or within the fuel tank 102, and connected to a heating power control system 155.

In an embodiment, the heating element 158 may be disposed adjacent to an outer surface of the fuel tank 102, provided the fuel tank is constructed of a thermally conductive material (e.g., copper, steel alloy, stainless steel). In an embodiment, the heating element 158 may be disposed within the fuel tank 102.

The heating power control system 155 is connected through a DC power line 152 to an electrical storage system (e.g., battery) 135. The heating power control system 155 draws electrical energy from the battery 135 through the DC power line 152 and controls the amount of heat produced by the heating element 158 to vaporize LLH fuel and to increase the fuel tank 102 pressure.

The heating power control system 155 may be any suitable control system. In an embodiment, the heating power control system 155 is an on/off relay switch.

The heating element 158 may be any suitable heater for use with a LLH fuel tank. For example the heating element 158 may be selected from the group consisting of resistance heaters, cartridge heaters, band heaters and inductive heaters (if the fuel tank 102 is ferrous metal). In an embodiment, the heating element 158 is a cartridge heater. Typically, a cartridge heater comprises an electric resistance embedded into a stainless steel tube, wherein the electric resistance is isolated from the stainless steel tube with magnesium oxide or other similar compound.

In an embodiment, the heating element 158 may be an inductive heater, provided the fuel tank 102 is constructed of a ferrous metal.

Figure 3A:
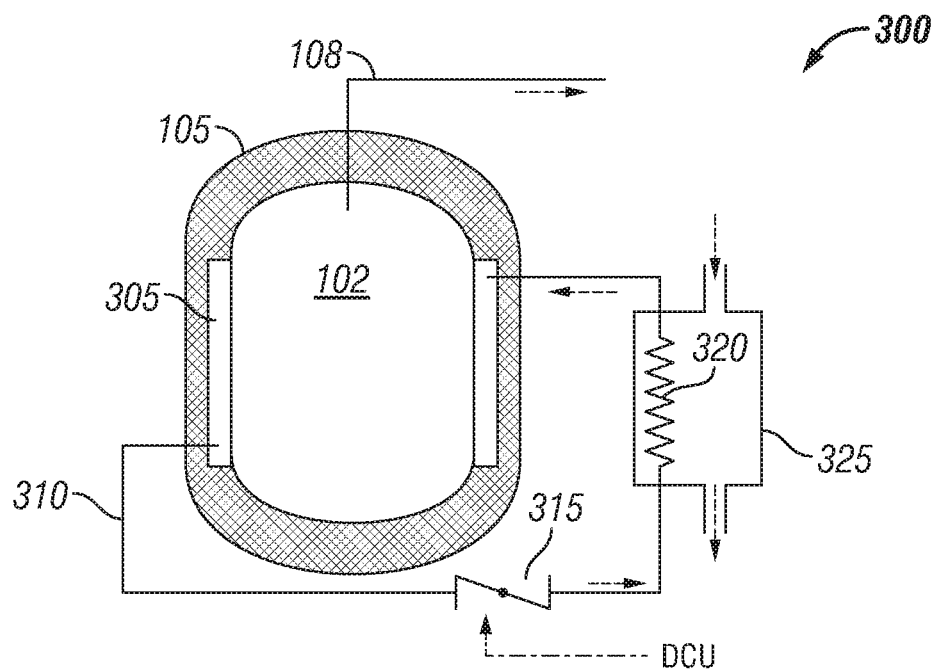
FIG. 3A illustrates a schematic of an alternate fuel tank heater for the liquefied light hydrocarbon fuel system of FIG. 2.
Figure 3B:
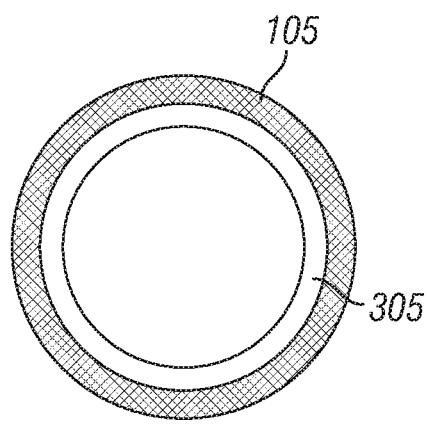
FIG. 3B illustrates a cross-section of a fuel tank, chamber and insulation for the liquefied light hydrocarbon fuel system of FIG. 3A.

Alternatively, a heat transfer chamber 305 may be used instead of or in addition to the heating element 158, as depicted in FIGS. 3A-3B.

In an embodiment, the fuel tank 102 has a buffer space for vaporized LLH fuel and to maintain the tank 102 pressure, as depicted in FIG. 1. Alternatively, a buffer tank 215 may be used in addition to the buffer space, as depicted in FIG. 2. The buffer space in the LLH fuel tank 102 and/or the buffer tank 215 must be sized to be large enough to permit vaporized LLH fuel to accumulate and to be drawn without sharp variations in pressure.

As shown in FIG. 1, the fuel tank 102 is connected through fuel line 108 to the fuel line 118. The fuel line 118 is connected to the inlet of the fuel control valve 120. The outlet of the fuel control valve 120 is adapted to connect to a fuel inlet of, for example, an internal combustion engine 122 of a hybrid vehicle. Although the combustion engine 122 is discussed in this example, this embodiment would also work with a sterling engine, a fuel cell or other similar energy conversion devices.

During operation, the fuel control valve 120 regulates the flow of vaporized LLH fuel into the fuel inlet of the internal combustion engine 122. The internal combustion engine 122 converts calorific energy of the vaporized LLH fuel into kinetic energy.

For obvious reasons, the internal combustion engine 122 must be large enough to meet the power requirements of the hybrid vehicle. The internal combustion engine 122 produces kinetic energy and drives a generator shaft 128 in a generator 130. The generator shaft 128 rotates and transmits kinetic energy from the internal combustion engine 122 to the generator 130. The generator 130 converts the kinetic energy into electrical energy in the form of alternating current (AC). The generator 130 may be any suitable electrical device capable of converting kinetic energy to electrical energy.

In an embodiment, the generator 130 is a permanent magnet two (2) or three (3) phase synchronous electric machine.

In an embodiment, the generator 130 may include current and/or voltage sensors. A battery charger system 132 comprises a rectifier, an inductance and other electronics to regulate current and voltage into an electric energy storage system (e.g., battery) 135. The battery charger system 132 rectifies the AC from the generator 130 into direct current (DC) and controls the rate of charge into the electrical energy storage system (e.g., battery) 135 to optimize battery 135 longevity.

The electrical energy storage system 135 may include a battery, a capacitor and other electric storage devices. In an embodiment, the electrical energy storage system 135 is a battery. The battery 135 must be large enough to allow the internal combustion engine 122 to run periodically overnight to consume excess vaporized LLH fuel without overcharging the battery 135.

An inverter 138 draws electrical energy from the battery 135 in the form of DC and coverts it into AC with a controllable frequency sufficient to power an electrical motor 140. The electrical motor 140 may be any suitable asynchronous or synchronous motor that can be used to power a vehicle drivetrain.

During regenerative braking, the electrical motor 140 acts as a generator and the inverter 138 returns electrical energy to the battery 135 in the form of DC. If the battery charge reaches a pre-set upper threshold, then a digital control unit (DCU) 142 could draw electrical energy from the battery into a resistor bank 145 or, as a last resort, vent vaporized LLH fuel to the atmosphere through the safety relief valve 112. The resistor bank 145 may be used to dissipate electrical energy from the battery 135 to prevent overcharging when the vehicle is idle and the internal combustion engine 122 is run to consume excess vaporized LLH fuel and to reduce the fuel tank 102 pressure.

FIG. 1 illustrates a schematic diagram of a DCU 142 for the fuel system 100 according to an embodiment of the present invention. The DCU 142 comprises a computer specially programmed with adequate interfaces to receive data signals from and send control signals to various components in, for example, a hybrid vehicle. For example, a software program may be configured to optimize vehicle operation according to various criteria (e.g., energy efficiency, battery life, performance, emissions reduction, total cost of ownership). It may also collect operating data that can be used to further optimize the system.

The software program may also be configured by the user according to the user's prioritized various criteria (e.g., energy efficiency, battery life, performance, emission reduction, total cost of ownership). It may also allow user configurations and settings that can be used to personalize the system Referring to the drawings in general, and initially to FIG. 1 in particular, an exemplary operating environment for implementing embodiments of the present invention is shown and designated generally as a DCU 142. The DCU 142 is but one example of a suitable computing environment and is not intended to suggest any limitation as to the scope of use or functionality of the invention. Neither should the DCU 142 be interpreted as having any dependency or requirement relating to any one or combination of the components illustrated.

Embodiments of the invention may be described in the general context of computer code or machine-executable instructions stored as program modules or objects and executable by one or more computing devices, such as a laptop, server, mobile device, tablet, etc. Generally, program modules including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks may be performed by remote-processing devices that may be linked through a communications network.

With continued reference to FIG. 1, the DCU 142 includes a first signal bus 148 that directly or indirectly connects the following components: safety relief valve 112, pressure sensor 115, fuel control valve 120, generator 130, battery charger system 132, electrical energy storage system (e.g., battery) 135, inverter 138, electrical motor 140, resistor bank 145 controller and heating power control system 155.

The first signal bus 148 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be fuzzy. For example, one may consider a presentation component such as a display device to be an I/O component. Additionally, many processors have memory. The inventors recognize that such is the nature of the art, and reiterate that the diagram of FIG. 1 is merely illustrative of an exemplary digital control unit that can be used in connection with one or more embodiments of the present invention.

The DCU 142 may include a variety of computer-readable media. Computer-readable media can be any available media that can be accessed by the DCU 142 and includes both volatile and nonvolatile media, removable and non-removable media. By way of example, and not limitation, computer-readable media may comprise computer-storage media and communication media. The computer-storage media includes volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the DCU 142.

The memory (not shown) may include computer-storage media in the form of volatile and/or nonvolatile memory. The memory may be removable, non-removable, or a combination thereof. Suitable hardware devices include solid-state memory, hard drives, optical-disc drives, etc. The DCU 142 includes a processor (not shown) that reads data from various entities such as the memory or the I/O components discussed below.

The DCU 142 receives digital signals from the pressure sensor 115, the generator 130, the battery charger system 132, the electrical energy storage system (e.g., battery) 135, inverter 138 and the electrical motor 140 through the first signal bus 148, as shown in FIG. 1.

The DCU 142 receives digital signals corresponding to the fuel tank 102 pressure from the pressure sensor 115 and monitors the tank 102 pressures through the first signal bus 148. When the fuel tank 102 pressure reaches a pre-set upper threshold, the DCU 142 opens the fuel control valve 120 and starts the internal combustion engine 122 to allow the engine 122 to consume any excess vaporized LLH fuel and to reduce the tank 102 pressure. The internal combustion engine 122 drives the generator 130 that provides the electrical energy to charge the battery 135 and drive the electric motor 140.

The DCU 142 receives digital or analog signals corresponding to current and voltage from the generator 130 through the first signal bus 148.

The DCU 142 receives digital or analog signals corresponding to current and voltage from the battery charger system 132 comprising the rectifier, inductance and other electronics to regulate current and voltage into the electrical energy storage system (e.g., battery) 135 through the first signal bus 148.

The DCU 142 receives digital or analog signals corresponding to current and voltage from the battery charger 132 and the electrical energy storage system (e.g., battery) 135 through the first signal bus 148.

The DCU 142 receives digital or analog signals corresponding to current and voltage from the inverter 138 through the first signal bus 148.

The DCU 142 receives digital or analog signals corresponding to current, voltage and revolutions per minute (rpm) from the electrical motor 140 through the first signal 10 bus 148.

The DCU 142 also sends control signals through the first signal bus 148 to the safety relief valve 112 (if electrically controllable), the fuel control valve 120, the internal combustion engine 122, the battery charger system 132, the inverter 138, the resistor bank 145 controller and the heating power control system 155. The DCU 142 sends control signals through the first signal bus 148 to the battery charger system 132 to regulate current and voltage into the electrical energy storage system (e.g., battery) 135.

The DCU 142 sends control signals through the first signal bus 148 to the inverter 138 to control the speed and power of the electrical motor 140.

The DCU 142 sends control signals through the first signal bus 148 to a solenoid to control the fuel control valve 120.

The DCU 142 sends control signals through the first signal bus 148 to the resistor bank 145 controller to regulate the flow of electrical energy into the bank 145.

The DCU 142 sends control signals through the first signal bus 148 to the heating power control system 155 to regulate the flow of electrical energy (by turning the power on and off) into the heating element 158.

The DCU 142 receives additional signals from a second signal bus 150, including driver commands for acceleration, braking, starting the engine, and the like.

Re-Fueling the Fuel Tank

Periodically, the hybrid vehicle may be re-fueled with LLH fuel through a re-fueling valve 110. Alternatively, a full LLH fuel tank 102 may be swapped for an empty one 102. An outlet of the re-fueling valve 110 is connected through the fuel line 108 to the fuel tank 102. The cold LLH fuel entering into a cold fuel tank 102, causes vaporized LLH fuel in the tank 102 to condense and to reduce the tank 102 pressure, allowing re-fueling of the tank 102.

In an embodiment, a level sensor may be disposed in the fuel tank 102 to prevent overfilling the tank 102. In an embodiment, the level sensor may be positioned to ensure a minimum buffer space in the fuel tank 102.

Idle or Parked Vehicle Operation

Figure 7:
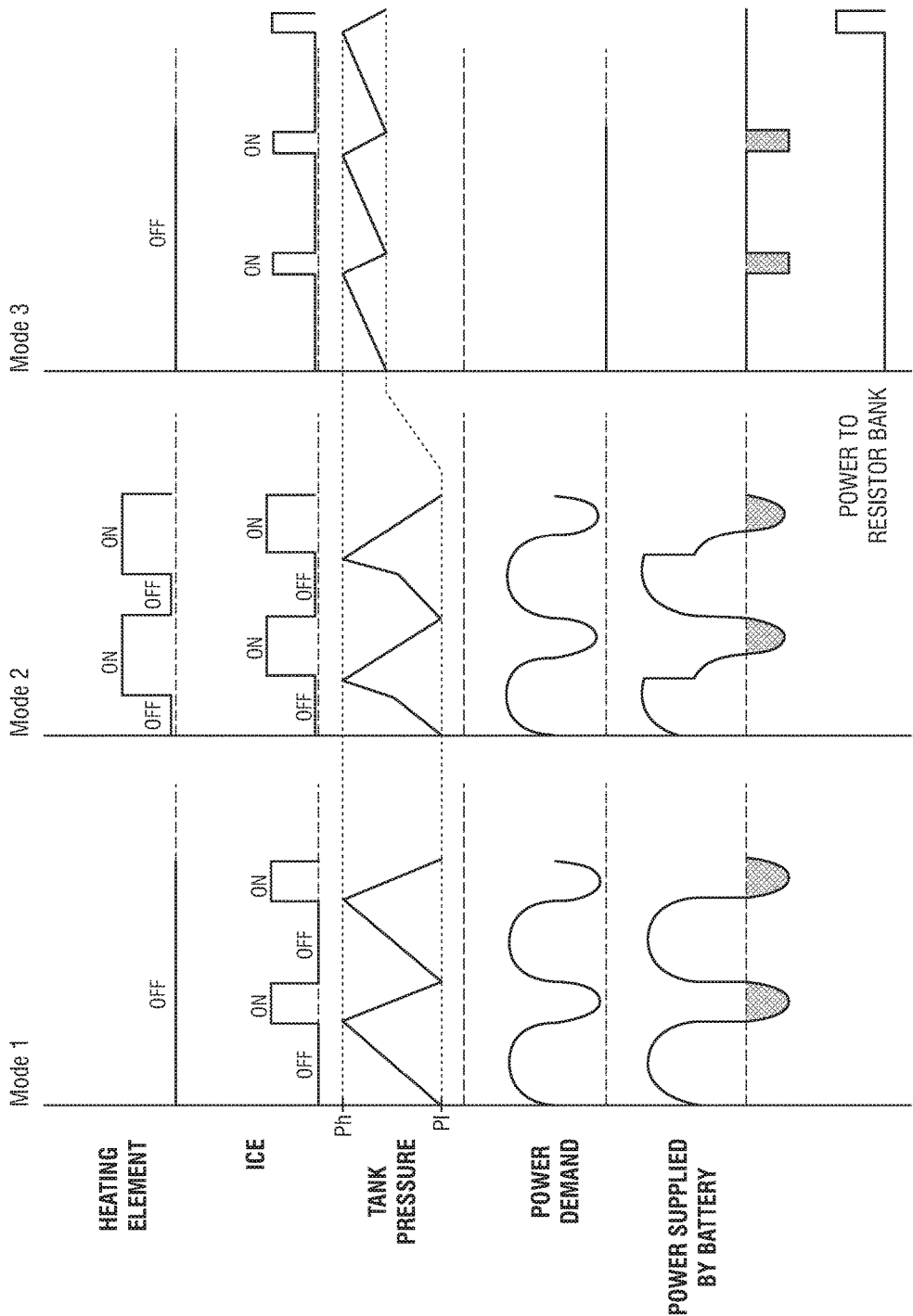
FIG. 7 illustrates charts of power output of heating element, power output of internal combustion engine (ICE)/generator, fuel tank pressure, power demand from electric motor and power drawn from battery vs. time for Mode 1: low power requirements (e.g., start/stop vehicle operation), Mode 2: high power requirements (e.g., acceleration, high speeds, heavy loads or low-battery charge vehicle operation), and Mode 3: no power requirements (e.g., idle or parked vehicle operation).

During idle or parked vehicle operation, the hybrid vehicle may be configured to cycle the internal combustion engine 122 periodically to consume excess vaporized LLH and to reduce pressure in the buffer space and/or the buffer tank 215. When the fuel 20 control valve 120 is closed, pressure gradually accumulates in the buffer space and/or the buffer tank 215 as ambient heat leaks into the fuel tank 102 through the insulation 105 and vaporizes LLH fuel. See e.g., FIG. 7: Mode 3. When the pressure increases to a pre-set upper threshold, the fuel control valve 120 is opened and the internal combustion engine 122 is started to consume excess vaporized LLH fuel and to reduce the pressure of the buffer space and/or the buffer tank 215. When the fuel control valve 120 is opened, the vaporized LLH fuel flows out of the buffer space and/or the buffer tank 215, and is consumed by the internal combustion engine 122, reducing the pressure in the buffer space and/or the buffer tank 215. Once the pressure drops to a pre-set safe level (consistent with the minimum pressure required by the internal combustion engine 122), the fuel control valve 120 is closed and the engine 122 is stopped. During idle or parked operation, the internal combustion engine 122 may be repeatedly cycled to consume excess vaporized LLH fuel and to reduce pressure in the buffer space and/or the buffer tank 215.

While the internal combustion engine 122 is running, the engine 122 produces kinetic energy and drives the generator shaft 128 in the generator 130, as discussed above. The generator 130 converts the kinetic energy into electrical energy in the form of AC. The battery charger system 132 rectifies the AC from the generator 130 into DC and controls the rate of charge into the battery 135. If the battery 135 charge reaches a pre-set upper threshold, the resistor bank 145 can be used to dissipate any excess electrical energy and to prevent the battery 135 from overcharging.

Alternatively, the safety relief valve 112 may vent the vaporized LLH fuel to the atmosphere to reduce the pressure in the buffer space and/or the buffer tank 215.

Normal Vehicle Operation

During normal operation, the hybrid vehicle may be configured to draw electric power from the battery 135. The electrical motor 140 is powered by the battery 135 through the inverter 138.

While the battery 135 charge remains above a pre-set lower threshold, the internal combustion engine 122 is started and stopped to consume excess vaporized LLH fuel and to reduce the fuel tank 102 pressure, as discussed above. See e.g., FIG. 7: Mode 3. The upper and lower fuel tank 102 pressure limits are set such that the pressure range is adequate for the proper function of the internal combustion engine 122.

When the battery 135 charge is discharged to a pre-set lower threshold, the internal combustion engine 122 is started to power the generator 130 and begin recharging the battery 135. See e.g., FIG. 7: Mode 2. If the pressure in the fuel tank 102 drops below a pre-set lower threshold, the heating power control system 155 is started to provide heat to the heating element 158 in the tank 102, increasing evaporation of the LLH fuel in the tank 102, and increasing the pressure of the vaporized LLH fuel in the buffer space and/or buffer tank 215. Once the battery 135 charge is recharged to a pre-set upper threshold, the fuel control valve 120 is closed and the internal combustion engine 122 is stopped. The internal combustion engine 122 is cycled to consume excess vaporized LLH fuel and to reduce the fuel tank 102 pressure, as described above. Id. at Modes 2 & 3.

Sudden Acceleration, High Speeds and Heavy Loads Vehicle Operation

During sudden acceleration, high speeds and/or heavy loads operation, the hybrid vehicle may be configured to draw upon the battery 135 to provide additional energy for the electrical motor 140, and, if additional power is required (e.g., battery charge is low), to heat the fuel tank 102 to provide additional vaporized LLH fuel for the internal combustion engine 122. See e.g., FIG. 7: Mode 2. With the additional vaporized LLH fuel from the tank 102, the engine 122 may be accelerated or operated at high speeds or heavy loads without a sudden drop in LLH fuel flow or pressure. During sudden acceleration, high speed and/or heavy loads operation, the internal combustion engine 122 would have enough vaporized LLH fuel to run properly.

Alternate Buffer System for Fuel Tank

An alternate buffer tank system 200 for the liquefied light hydrocarbon fuel system 100 according to an embodiment of the present invention is illustrated in FIG. 2. FIG. 2 shows the alternate buffer tank system 200 for the fuel tank 102 that allows excess 10 vaporized LLH fuel to leave the tank 102 and to be stored in a buffer tank 215.

In this embodiment, the buffer tank system comprises the buffer tank 215, the safety relief valve 112 and the pressure sensor 115. Instead of connecting to the inlet of the fuel control valve 120, the second end of the fuel line 108 connects to an inlet to a buffer tank 215. Instead of connecting to the fuel control valve 120, an outlet to the buffer tank 215 connects to an inlet to a solenoid valve 205, and an outlet to the solenoid valve 205 connects to an inlet of a pressure regulator 210. An outlet of the pressure regulator 210 is adapted to connect to a fuel inlet of, for example, an internal combustion engine 122. In an embodiment, the internal combustion engine 122 is a spark-plug engine. Although the combustion engine 122 is discussed in this example, this embodiment would also work with a sterling engine, a fuel cell or other similar energy conversion devices. Importantly, the fuel control valve 120 and the solenoid valve 205 in connection with the pressure regulator 210 serve the same functional purpose (i.e., to control the flow of the vaporized LLH fuel).

Similar to the fuel tank 102 of FIG. 1, the buffer tank 215 may be constructed in any suitable shape and/or thickness for a vehicle application. For example, the shape of the buffer tank 215 may be spherical, cylindrical with hemispherical ends, toroidal or any other shape suitable for relatively high pressures. Further, the buffer tank 215 must satisfy U.S. Department of Transportation (DOT) requirements. In an embodiment, the buffer tank 215 is cylindrical with hemispherical ends.

The buffer tank 215 may be constructed from any suitable material with resistance to cold temperatures and relatively high pressures. For example, the buffer tank 215 may be constructed from the group consisting of aluminum, copper, steel alloy and stainless steel. In an embodiment, the buffer tank 215 is steel alloy.

Similar to the embodiment of FIG. 1, the fuel tank 102 connects through the fuel line 108, the buffer tank 215, the solenoid valve 205 and the pressure regulator 210 to a fuel inlet of, for example, an internal combustion engine 122. Although the combustion engine 122 is discussed in this example, this embodiment would also work with a sterling engine, a fuel cell or other similar energy conversion devices. As in FIG. 1, the fuel tank 102 is connected through a fuel line 108 to a re-fueling valve 110.

The DCU 142 receives digital signals corresponding to current, voltage and revolutions per minute (rpm) from the electrical motor controller 225 through the first signal bus 148.

The DCU 142 sends control signals through the first signal bus 148 to the resistor bank controller 220 to regulate the flow of electrical energy into the bank 145.

Alternate Heating System for Fuel Tank

An alternate fuel tank heating system 300 for the liquefied light hydrocarbon fuel system 100 according to an embodiment of the present invention is illustrated in FIGS. 3A-3B. FIG. 3A shows the alternate heating system 300 for the fuel tank 102 that allows incremental heat to enter the tank 102.

FIG. 3B shows a cross-section of a chamber 305, the fuel tank 102, and the insulation 105 for the alternate fuel tank heating system 300 of FIG. 3A. As shown in FIG. 3B, the chamber 305 is disposed between an outer surface of the fuel tank 102 and the insulation 105.

In an embodiment, the chamber 302 may be constructed from two (2) layers of metal separated by a gap to form an internal void. The edges of the two (2) layers are joined to form a sealed chamber. The edges may be joined in any manner suitable to for a seal. To provide heat transfer between the fuel tank 102 and the chamber 305, the outer surface of the fuel tank 102 is in contact with the inner metal layer of the chamber 305. A heat transfer compound suitable for cryogenic temperatures may be used to improve the contact between the outer surface of the fuel tank 102 and the inner metal layer of the chamber 305.

The chamber 305 may be constructed of any suitable metal. For example, the chamber 305 may be constructed from the group consisting of aluminum, copper, steel alloy and stainless steel.

In another embodiment, the chamber 305 may be formed from a plastic shell disposed around the fuel tank 102. The plastic shell may be a single molded piece or it may be a plurality of pieces. The plastic shell forms an interior void between the outer surface of the fuel tank 102 and the inner surface of the plastic shell. The edges of the plastic shell are affixed to the fuel tank 102 to form a sealed chamber. The edges of the plastic shell may be affixed to the fuel tank 102 in any manner suitable to form a seal.

The plastic shell may be constructed from any suitable plastic. For example, the plastic shell may be constructed from the group consisting of polyvinylchloride (PVC) and any other plastics suitable for cryogenic temperatures.

In yet another embodiment, the chamber 305 may be formed from a gap between the outer surface of the fuel tank 102 and an inner surface of the insulation 105. A plurality of separators may be used to keep the inner surface of the insulation 105 from contacting the outer surface of the fuel tank 102. The inner surface of the insulation 105 may be sealed with any suitable material to prevent leakage of a heat transfer fluid through the insulation 105. For example, the inner surface of the insulation 105 may be sealed with a material selected from the group consisting of silicon, silicon rubber and any other sealing materials suitable for cryogenic temperatures.

The chamber 305 is filled with a heat transfer fluid at a relatively low pressure. The heat transfer fluid may be any suitable heating fluid. For example, the heat transfer fluid may be selected from the group consisting of air, nitrogen, helium or other inert gases with a boiling point below −163° C. In an embodiment, the heat transfer fluid is nitrogen.

The heat transfer fluid may be at any suitable pressure. For example, the heat transfer fluid may be at any pressure from about one (1) atmosphere to about three (3) atmospheres. In an embodiment, the heat transfer fluid is slightly above one (1) atmosphere.

In an embodiment, the heat transfer fluid line 310 has a first end and a second end. The first end the heat transfer fluid line 310 connects an outlet of the chamber 305 and the second end of the heat transfer fluid line 310 connects to an inlet of a butterfly valve 315.

The heat transfer fluid line 310 may be constructed from any suitable metal or plastic. For example, the heat transfer fluid line 310 may be constructed from the group consisting of copper and stainless steel, rubber, braided rubber, nitrile rubber, silicone rubber and polyvinylchloride. In an embodiment, the line 310 is constructed from rubber. An outlet of the butterfly valve 315 connects to an inlet of a heat transfer coil 320 disposed within the heat exchanger 325; and an outlet to the heat transfer fluid 320 connects to an inlet of the chamber 305.

The heat exchanger 325 may be constructed of any suitable metal or plastic. For example, the heat exchanger 325 may be constructed from the group consisting of aluminum, copper, steel alloy, stainless steel, tin, tin plate, polyvinylchloride and any other plastic suitable for the required temperatures. In an embodiment, the heat exchanger 325 is copper.

The heat transfer fluid coil 320 may be constructed of any suitable material. For example the heat transfer fluid coil 320 may be constructed from the group consisting of copper, steel alloy and stainless steel. In an embodiment, the heat transfer fluid coil 320 is copper.

The butterfly valve 315 controls the flow rate of the heat transfer fluid from the outlet of the chamber 305 to the inlet of the chamber 305 due to convectional heating. In an embodiment, the butterfly valve 315 is in communication with and controlled by the digital control unit 142 through a solenoid actuator or similar mechanism.

In an embodiment, ambient air flows across the outer surface of the heat transfer fluid coil 320 to heat the coil 320. In this embodiment, the heat exchanger 325 is not required.

When required, the heat exchanger 325 has an inlet and an outlet for heat exchanger fluid. In an embodiment, the inlet to the heat exchanger 325 is adjacent to the outlet of the heat transfer fluid coil 320; and outlet to the heat exchanger 325 is adjacent to the inlet of the coil 320. In an embodiment, the inlet to the heat exchanger 325 is adjacent to the inlet of the heat transfer fluid coil 320; and outlet to the heat exchanger 325 is adjacent to the outlet of the coil 320.

The heat exchanger fluid may be any suitable heating/cooling fluid. For example, the heat exchanger fluid may be selected from the group consisting of air, nitrogen, carbon dioxide, water and treated water. In an embodiment, the heat exchanger fluid is treated water. As typical in automotive applications, the engine cooling water may be treated with corrosion inhibitors and/or antifreeze additives.

In an embodiment, an outlet of a water cooling system (e.g., outlet to radiator) for the internal combustion engine 122 may be connected to the inlet of the heat exchanger 325. The treated water flows across the outer surface of the heat transfer fluid coil 320 to heat the coil 320. An outlet of the heat exchanger 325 is connected to an inlet of the water cooling system (e.g., inlet to radiator).

Similar to the embodiment of FIG. 2, a fuel line 108 connects the fuel tank 102 to a buffer tank 215.

Alternate Dual Fuel Line System

Figure 4:
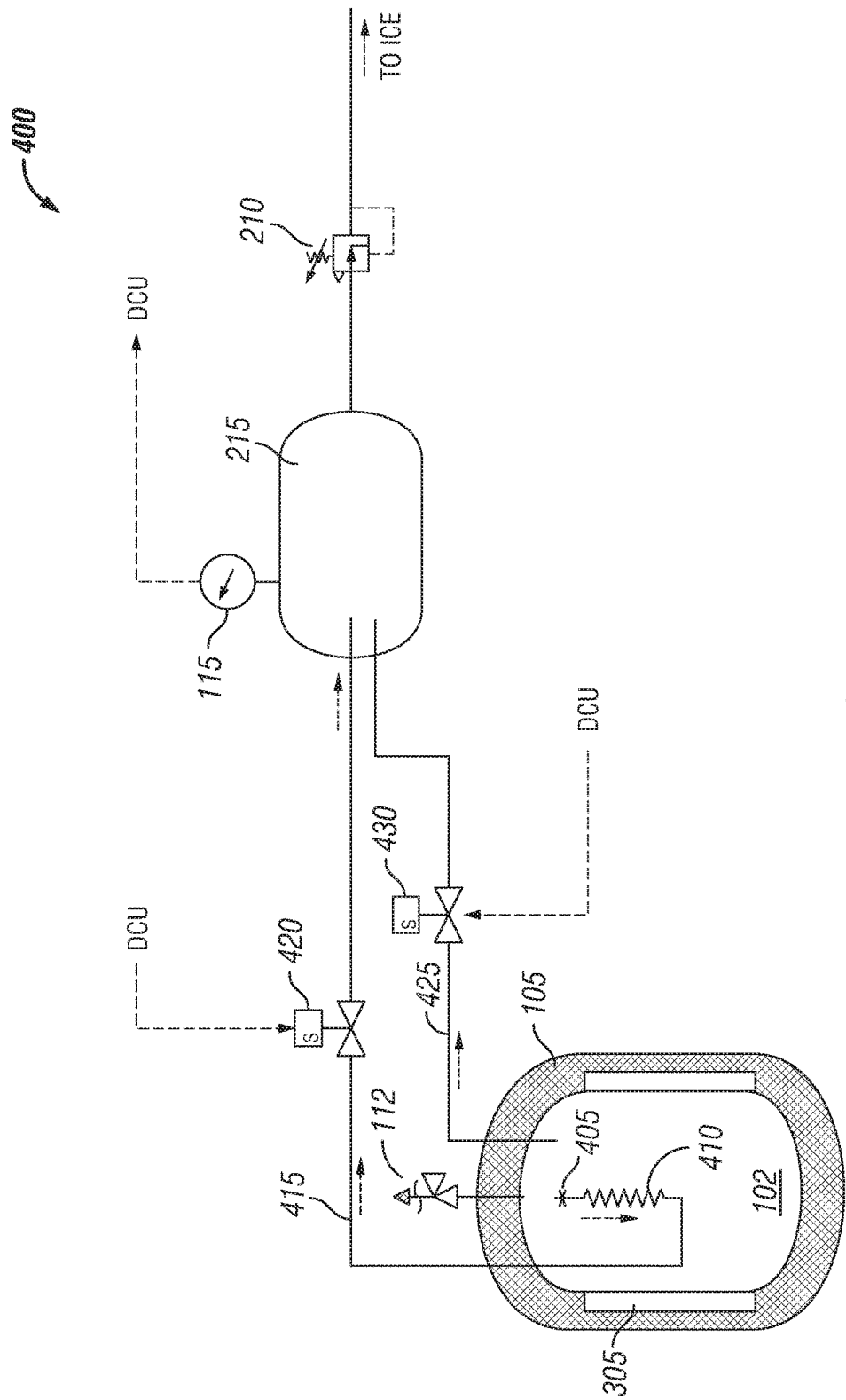
FIG. 4 illustrates a schematic for an alternate dual fuel line for the liquefied light hydrocarbon fuel system of FIG. 1.

An alternate dual fuel line system 400 for the liquefied light hydrocarbon fuel system 100 according to an embodiment of the present invention is illustrated in FIG. 4. FIG. 4 shows the alternate dual fuel line system 400 that reduces the net heat accumulation in the fuel tank 102.

As shown in FIG. 4, the fuel tank 102 is connected through a first fuel line 415 and a first solenoid valve 420 to the buffer tank 215. An inlet to the safety relief valve 112 is connected to the fuel tank 102.

In an embodiment, the first fuel line 415 has a first end and a second end. In an embodiment, the first end of the first fuel line 415 extends into a buffer space of the fuel tank 102. In an embodiment, a fuel coil 410 has a first end and a second end. The first end of the first fuel line 415 connects to the first end of the fuel coil 410, and second end of the fuel coil 410 connects to an outlet of an orifice plate 405. The second end of the first fuel line 415 connects to an inlet of the first solenoid valve 420.

The fuel coil 410 may be constructed of any suitable material with a high thermal conductivity. For example, the fuel coil 410 may be constructed from the group consisting of aluminum, copper, steel alloy and stainless steel. In an embodiment, the fuel coil 410 is copper.

The fuel line 415 may be constructed of any suitable material. For example, the fuel line 415 may be constructed from the group consisting of aluminum, copper, steel alloy, stainless steel, rubber, braided rubber, nitrile rubber, silicon rubber and polyvinylchloride. In an embodiment, the fuel line 415 is copper.

The fuel line 415 must have a wall thickness sufficient to handle the maximum fuel tank 102 pressure. The fuel line 415 must have a cross-section to provide enough fuel to, for example, an internal combustion engine 122. Although the combustion engine 122 is discussed in this example, this embodiment would also work with a sterling engine, a fuel cell or other similar energy conversion devices.

The orifice plate 405 limits the flow of LLH fuel, acting as a throttling mechanism.

The fuel tank 102 is also connected through a second fuel line 425 and a second solenoid valve 430 to the buffer tank 215.

In an embodiment, the second fuel line 425 serves as a LLH fuel intake to refill the fuel tank 102. An outlet of the re-fueling valve (not shown) is connected through the second fuel line 425 to the fuel tank 102. In an embodiment, a level sensor (not shown) may be disposed in the fuel tank 102 to prevent overfilling the tank 102. In an embodiment, the level sensor may be positioned to ensure a minimum buffer space in the fuel tank 102.

In an embodiment, the second fuel line 425 has a first end and a second end. In an embodiment, the first end of the second fuel line 425 extends into a buffer space of the fuel tank 102.

The second fuel line 425 may be constructed of any suitable material.

For example, the second fuel line 425 may be constructed from the group consisting of copper, steel alloy, stainless steel, rubber, braided rubber, nitrile rubber, silicon rubber and polyvinylchloride. In an embodiment, the fuel line 425 is copper.

The second fuel line 425 must have a wall thickness sufficient to handle the maximum fuel tank 102 pressure. The second fuel line 425 must have a cross-section to provide enough fuel to, for example, an internal combustion engine 122. Although the combustion engine J 22 is discussed in this example, this embodiment would also work with a sterling engine, a fuel cell or other similar energy conversion devices.

The second end of the first fuel line 415 connected to an inlet of a first solenoid valve 420 to the buffer tank 215.

Similar to the embodiment of FIG. 1, the digital control unit 142 controls the first solenoid valve 420 and the second solenoid valve 430. Typically, the first solenoid valve 420 and the second solenoid valve 430 would not open at the same time.

When the first solenoid valve 420 is open and vaporized LLH fuel flows through the first fuel line 415 to the buffer tank 215, the orifice plate 405 creates a pressure differential between the fuel tank 102 and inside the fuel coil 410. As the vaporized LLH fuel flows through the orifice plate 405 and expands into the fuel coil 410, the temperature drops due to the Joule-Thompson effect. This reduces the temperature for the fuel coil 410 below the temperature of the buffer space inside fuel tank 102 and results in heat transfer from the tank 102 to the vaporized LLH fuel inside the coil 410. This heat is removed by the vaporized LLH fuel flowing through fuel line 415 to the buffer tank 215.

The first fuel line may be used during idle or low power demand periods to cool the fuel tank 102 and to reduce the tank 102 pressure.

The second end of the second fuel line 425 connects to an inlet of the second solenoid valve 430 to the buffer tank 215.

Similar to the embodiments of FIGS. 1-2, the second fuel line 425 is used during normal operation.

An outlet to the buffer tank 215 connects to the inlet to the pressure regulator 210. The outlet of the pressure regulator 210 is adapted to connect to a fuel inlet of, for example, an internal combustion engine 122. Although the combustion engine 122 is discussed in this example. This embodiment would also work with a sterling engine, a fuel cell or other similar energy conversion devices.

Alternate Dual Fuel Tank System

Figure 5:
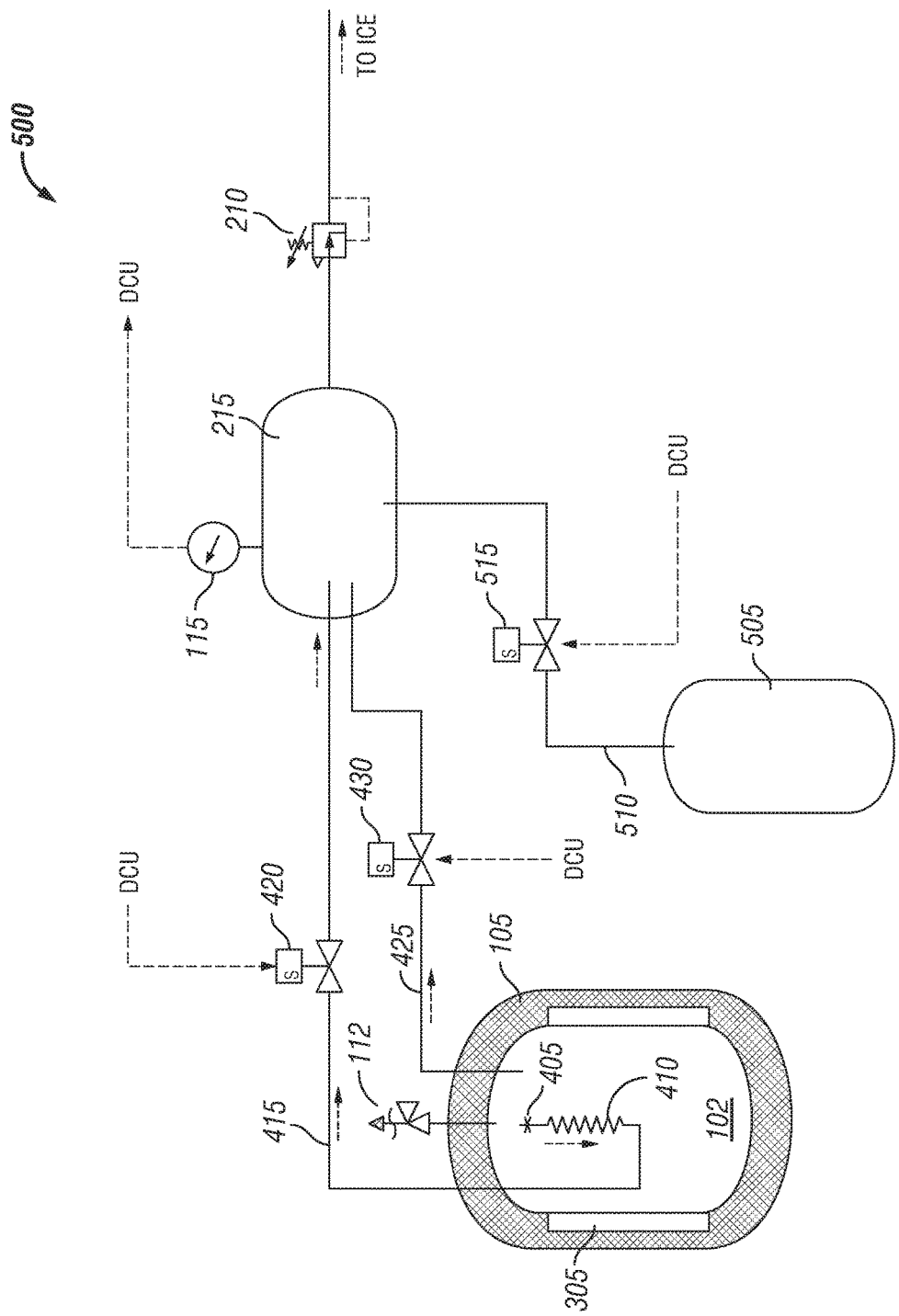
FIG. 5 illustrates a schematic for an alternate dual fuel tank for the liquefied light hydrocarbon fuel system of FIG. 2.

An alternate dual fuel tank system 500 for the liquefied light hydrocarbon fuel system 100 according to an embodiment of the present invention is illustrated in FIG. 5. FIG. 5 shows the alternate dual fuel tank system 500 that provides additional vapor fuel to leave a second fuel tank 505 and to be stored in the buffer tank 215.

As shown in FIG. 5, the second fuel tank 505 is connected through a third fuel line 510 and a third solenoid valve 515 to the buffer tank 215.

In an embodiment, the third fuel line 510 has a first end and a second end. In an embodiment, the first end of the third fuel line 510 extends into a buffer space of the second fuel tank 505.

The third fuel line 510 may be constructed of any suitable material. For example, the third fuel line 510 may be constructed from the group consisting of copper, steel alloy, stainless steel, rubber, braided rubber, nitrile rubber, silicon rubber and polyvinylchloride. In an embodiment, the third fuel line 510 is copper.

The third fuel line 510 must have a wall thickness sufficient to handle the maximum fuel tank 505 pressure. The third fuel line 510 must have a cross-section to provide enough fuel to, for example, an internal combustion engine 122. Although the combustion engine 122 is discussed in this example, this embodiment would also work with a sterling engine, a fuel cell or other similar energy conversion devices.

The second fuel tank 505 may be constructed in any suitable shape and/or thickness for a vehicle application. For example, the shape of the second fuel tank 505 may be spherical, cylindrical with hemispherical ends, toroidal or any other shape suitable for relatively high pressures. Further, the second fuel tank 505 must satisfy U.S. Department of Transportation (DOT) requirements. In an embodiment, the second fuel tank 505 is a cylinder with hemispherical ends.

The second fuel tank 505 may be constructed from any suitable material with resistance to relatively high pressures and, in an alternative embodiment, to cold temperatures. For example, the second fuel tank 505 may be constructed from the group consisting of aluminum, copper, steel alloy and stainless steel. In an embodiment, the second fuel tank 505 is steel alloy.

In an embodiment, the second fuel tank 505 is not insulated because the tank 505 is maintained at ambient temperatures.

Under normal ambient operating conditions, the second fuel tank 505 must contain a hydrocarbon fuel that can be liquefied at ambient temperatures and at a pressure between about 15 psi and about 300 psi (e.g., LPG). For example, light hydrocarbons may be selected from the group consisting of propane, isopropane, propylene, propane gas, butane, isobutane, isobutene, butylene, petroleum gas and mixtures thereof. In an embodiment, the hydrocarbon fuel in the second fuel tank 505 is LPG.

In an alternate embodiment, the second fuel tank 505 is insulated because the tank is maintained at cryogenic temperatures.

Under normal cryogenic operating conditions, the second fuel tank 505 must contain LLH fuel at a cryogenic temperature between about −170° C. and about −120° C. and at a pressure between about 15 psi and about 300 psi. Similar to the embodiments of FIGS. 1-4, the LLH fuel may be any suitable liquefied light hydrocarbons. For example, the light hydrocarbons may be selected from the group consisting of hydrogen, methane, natural gas, ethane, ethylene, propane, isopropane, propylene, propane gas, butane, isobutane, isobutene, butylene, petroleum gas and mixtures thereof. As heat leaks into the second fuel tank 505 through the insulation (not shown), the heat will cause the LLH fuel to boil and to evaporate, forming vaporized LLH fuel. In an embodiment, a LLH fuel (that is predominately methane) is typically stored at a cryogenic temperature between about −170° C. and about −120° C. inside a fuel tank at a pressure between about 15 psi and about 200 psi. In an embodiment, the LLH fuel in the second fuel tank 505 is LNG.

The second fuel tank 505 is insulated to protect the LLH fuel from ambient heat. In other words, the LLH fuel must be maintained at a low temperature to minimize evaporation in the second fuel tank 505. The insulation limits ambient heat from entering the second fuel tank 505. The insulation may be any suitable material with low thermal conductivity. For example, the insulation may be selected from the group consisting of supercritical-dried gels (e.g., Aerogel®, Spacetherm®), fiberglass, glass wool, wood, cardboard and polystyrene foam (e.g., Styrofoam®). In an embodiment, the insulation consists of a plurality of layers of supercritical-dried gel blankets (e.g., Aerogel® blanket, Spacetherm® blanket) surrounded by an aluminum shell.

In an embodiment, the outer surface of the insulation may be covered with a highly reflective material or radiation barrier (e.g., aluminum foil) to reduce the amount of outside radiation entering the second fuel tank 505.

In another embodiment, the insulation may be an air gap or a vacuum chamber in a double shell, Dewar-type second fuel tank 505 to limit heat conduction and convection into the second tank 505. In an embodiment, the outside surface of the inner shell of the Dewar-type second fuel tank 505 may be covered with the highly reflective material or radiation barrier (e.g., aluminum foil), as discussed above.

The amount and type of insulation should be optimized to keep the LLH evaporation rate below a desired level. This maximum evaporation rate (i.e., boiling rate) should allow the pressure in the second fuel tank 505 to be maintained below a safety limit to prevent overnight venting of vaporized LLH fuel or running the internal combustion engine 122 to consume excess vaporized LLH fuel levels.

In an embodiment, the second fuel tank 505 has a tank heating system, as depicted in FIGS. 1-3. In an embodiment, the tank heating system comprises a second heating element (not shown) disposed adjacent to or within the second fuel tank 505 and connected to a second heating power control system (not shown).

In an embodiment, the second heating element (not shown) may be disposed adjacent to an outer surface of the second fuel tank 505, provided the fuel tank is constructed of a thermally conductive material (e.g., copper, steel alloy, stainless steel).

In an embodiment, the second heating element may be disposed within the second fuel tank 505.

The second heating power control system (not shown) is connected through a second DC power line (not shown) to a battery 135. The second heating power control system draws electrical energy from the battery 135 through a second DC power line and controls the amount of heat produced by the second heating element to vaporize LLH fuel and to maintain the second tank 505 pressure.

The second heating element may be any suitable heater for use with a LLH fuel tank. For example the second heating element may be selected from the group consisting of inductive heaters, resistance heaters, cartridge heaters, band heaters and induction heaters (if the fuel tank 505 is ferrous metal). In an embodiment, the second heating element is a cartridge heater. In an embodiment, the second heating element may be an inductive heater, provided the second fuel tank 505 is constructed of a ferrous metal.

Alternatively, a second heat transfer chamber (not shown) may be used instead of the second heating element, as depicted in FIGS. 3A-3B.

In an embodiment, the second fuel tank 505 has a buffer space for vaporized LLH fuel and to maintain the second tank 505 pressure. Alternatively, a buffer tank 215 may be used in addition to or instead of the buffer space, as depicted in FIG. 5.

Similar to the embodiment of FIG. 4, the second fuel tank 505 is connected through the third fuel line 510, the third solenoid valve 515, the buffer tank 215 and the pressure regulator 210 to a fuel inlet of, for example, an internal combustion engine 122. Although the combustion engine 122 is discussed in this example, this embodiment would also work with a sterling engine, a fuel cell or other similar energy conversion devices. The second end of the third fuel line 510 is connected to an inlet of the third solenoid valve 515, and an outlet of the third solenoid valve 515 is connected to an inlet of the buffer tank 215. If the first fuel tank 102 cannot vaporize enough LLH fuel to meet demands, or if the first tank 102 runs out of fuel, the third solenoid valve 515 can be opened for the second tank 505 to provide additional fuel as backup.

Similar to the embodiments of FIGS. 1 and 4, the DCU 142 controls the third solenoid valve 515.

The outlet to the buffer tank 215 connects to the inlet to the pressure regulator 210. The outlet of the pressure regulator 210 is adapted to connect to a fuel inlet of, for example, an internal combustion engine 122. Although the combustion engine 122 is discussed in this example, this embodiment would also work with a sterling engine, a fuel cell or other similar energy conversion devices.

In an embodiment, the third fuel line 510 may serve as a LLH fuel intake to refill the second fuel tank 505. An outlet of the re-fueling valve (not shown) is connected through the third fuel line 510 to the second fuel tank 505. In an embodiment, a level sensor (not shown) may be disposed in the second fuel tank 505 to prevent overfilling the second tank 505. In an embodiment, the level sensor may be positioned to ensure a minimum buffer space in the second fuel tank 505.

Alternate Energy Storage System

Figure 6:
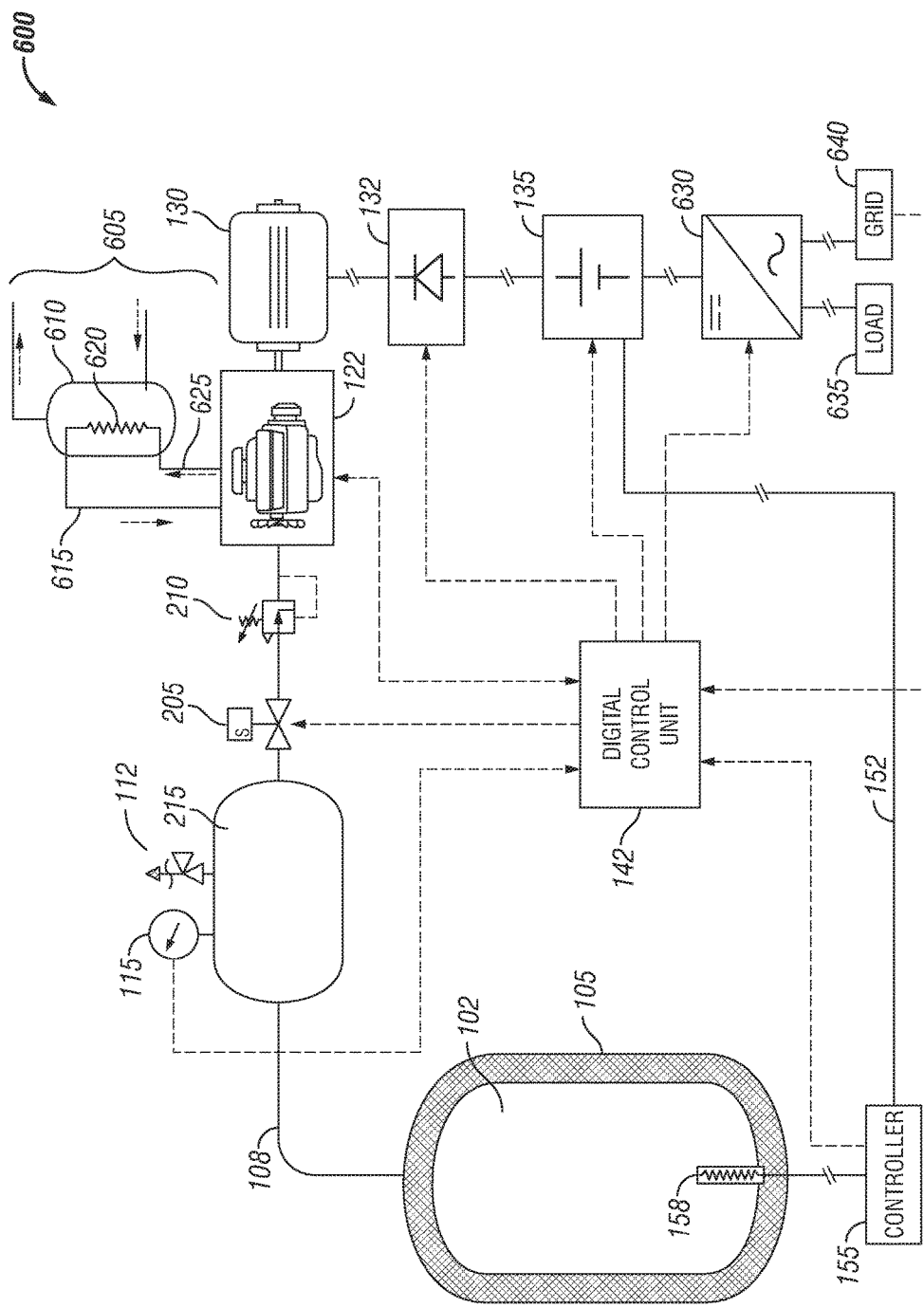
FIG. 6 illustrates a schematic for an alternate liquefied light hydrocarbon fuel system for a stationary applications according to an embodiment of the present invention.

An alternate energy storage system 600 for the liquefied light hydrocarbon fuel system 100 according to an embodiment of the present invention is illustrated in FIG. 6. FIG. 6 shows the alternate energy storage system 600 that provides energy to a machine, a vehicle, a house or a commercial/industrial facility. This embodiment can be useful especially in emerging markets, where fuel oil and/or diesel are used to produce heat and electricity in remote locations.

In this embodiment, the internal combustion engine 122, for example, stores thermal energy (heat) in a hot water heater system 605. Although the combustion engine 122 is discussed in this example, this embodiment would also work with a sterling engine, a fuel cell or other similar energy conversion devices. The hot water heater system 605 comprises a water tank 610, a first water line 615, a heating coil 620 and a second water line 625. The heating coil 620 is disposed within the water tank 610.

The first water line 615 has a first end and a second end, the heating coil 620 has a first end and a second end, and the second water line 625 has a first end and a second end. The first end of the first water line 615 connects to an outlet of the cooling system to the internal combustion engine 122, and the second end of the first water line 625 connects to the first end of the heating coil 620. The second end of the heating coil 620 connects to the first end of the second water line 625, and the second end of the second water line 625 connects to an inlet to the cooling system of the internal combustion engine 122.

The first water line 615 and the second water line 625 may be constructed of any suitable material. For example, the water lines 615, 625 may be constructed from the group consisting of copper, steel alloy and stainless steel, rubber, polyvinylchloride and any other plastic that is suitable for handling cooling system water from an internal combustion engine. In an embodiment, the water lines 615, 625 are copper.

The heating coil 620 may be constructed of any suitable material with a high thermal conductivity. For example, the heating coil 620 may be constructed from the group consisting of copper, steel alloy and stainless steel. In an embodiment, the heating coil 620 is copper.

In an embodiment, electrical energy from an inverter 630 may be used to power electrical devices 635 or, if necessary, transfer electrical energy to a main electrical grid 640. In an embodiment, the inverter 630 comprises an interface to provide electrical energy to electrical devices 635 and/or transfer electrical energy to the power grid 640. This embodiment may be used to provide heat and/or electric power to machines, vehicles (e.g., vessels, trains, busses, and motor homes), a house or a commercial/industrial facility.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

Definitions

As used herein, the terms "a," "an," "the," and "said" when used in conjunction with the term "comprising" means one or more, unless the context dictates otherwise.

As used herein, the term "about" means the stated value plus or minus a margin of error or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the phrase "consisting essentially of" occupies a middle ground, allowing the addition of non-material elements that do not substantially change the nature of the invention, such as various buffers, differing salts, extra wash or precipitation steps, pH modifiers, and the like.

As used herein, the term "simultaneously" means occurring at the same time or about the same time, including concurrently.

INCORPORATION BY REFERENCE

All patents and patent applications, articles, reports, and other documents cited herein are fully incorporated by reference to the extent they are not inconsistent with this invention.

What is claimed is:

1. A hybrid vehicle comprising:
   a liquefied light hydrocarbon or hydrogen fuel system fluidly connected to an energy conversion device selected from the group consisting of internal combustion engines, fuel cells and sterling engines, the liquefied light hydrocarbon or hydrogen fuel system comprising:
   a. a fuel tank comprising:
      (i) a chamber containing a liquified fuel selected from the group of light hydrocarbons, hydrogen and mixtures thereof;
      (ii) a buffer space, within the chamber configured to contain a vaporized fuel within the buffer space;
      (iii) a wall with an outer surface and an inner surface, wherein the inner surface is in contact with the chamber and the buffer space;
      (iv) an orifice plate in the buffer space adapted to enable expansion of the vaporized fuel through the orifice plate whereby the pressure and temperature of the vaporized fuel are reduced and provide a cooling effect as the vaporized fuel flows from the buffer space through the orifice plate;
      (v) a fuel coil connected to the orifice plate adapted to provide heat transfer from the fuel tank to the vaporized fuel inside the fuel coil whereby heat is removed by the vaporized fuel flowing through the fuel coil as the orifice plate creates a pressure and temperature differential between the fuel tank and the inside of the fuel coil;
   b. a heat transfer chamber adjacent to the outer surface of the wall wherein the heat transfer chamber is in thermal contact with the outer surface of the wall;

c. a first fuel line attached to the fuel tank conveying a first fuel vapor from the buffer space wherein an inlet to the first fuel line is connected to an outlet of the fuel coil;
d. a second fuel line connected to the fuel tank wherein the second fuel line conveys a second fuel vapor from the buffer space;
e. a first solenoid valve configured to control the flow of the first fuel vapor whereby the amount of cooling from the fuel coil can be controlled;
f. a second solenoid valve configured to control the flow of the second fuel vapor;
g. a buffer tank for receiving the first and second fuel vapors;
h. a pressure sensor for detecting pressure of the first and second fuel vapors in the buffer tank;
i. a pressure regulator to regulate the flow of combined fuel vapor through a third fuel line, wherein a first end of the third fuel line is connected to the buffer tank and a second end of the third fuel line is connected to an inlet to the pressure regulator, and an outlet of the pressure regulator conveys fuel vapor to the energy conversion device;
j. a thermal insulation surrounding the fuel tank and the heat transfer chamber.

2. The hybrid vehicle of claim 1, wherein the energy conversion device is an internal combustion engine or a Stirling engine and the liquefied fuel is selected from the group consisting of: hydrogen, methane, natural gas, ethane, ethylene, propane, propylene, butane, isobutene, isobutene, butylene, and mixtures thereof.

3. The hybrid vehicle of claim 1, wherein the liquid fuel is maintained at a pressure between about 15 psi and about 300 psi.

4. The hybrid vehicle of claim 1, wherein the fuel tank is spherical, cylindrical with hemispherical ends or toroidal shape.

5. The hybrid vehicle of claim 1, wherein the thermal insulation material is selected from a group consisting of supercritical-dried gels, fiberglass, glass wool, wood, cardboard and polystyrene foam.

6. The hybrid vehicle of claim 5, wherein the thermal insulation is surrounded by a reflective material or radiation barrier.

7. The hybrid vehicle of claim 6, wherein the thermal insulation further comprises an air gap or a vacuum chamber.

8. The hybrid vehicle of claim 1, wherein the energy conversion device is an internal combustion engine, the hybrid vehicle further comprising:
   a. a generator connected to the internal combustion engine;
   b. a battery connected to the generator through a battery charger system;
   c. an electric motor connected to the battery through a converter
wherein the internal combustion engine drives the generator that provides electrical energy to charge the battery and drive the electric motor to operably move the hybrid vehicle.

9. The hybrid vehicle of claim 1, wherein the inlet of a safety relief valve connects to the buffer tank and the pressure sensor is disposed within the buffer tank.

10. The hybrid vehicle of claim 1, further comprising a heating system wherein the heating system comprises:
   a. a heat transfer fluid within the heat transfer chamber at a predetermined pressure;
   b. a heat transfer line connected to an outlet of the heat transfer chamber;
   c. a butterfly valve connected to the heat transfer line configured to control the flow of heat transfer fluid through the heat transfer line;
   d. a heat transfer coil within a heat exchanger; wherein an outlet of the butterfly valve connects to an inlet of the heat transfer coil and an outlet to the heat transfer coil connects to an inlet of the heat transfer chamber.

11. The hybrid vehicle of claim 10, wherein the heat transfer fluid is selected from the group consisting of air, nitrogen, and helium.

12. The hybrid vehicle of claim 10, wherein an outlet of a cooling system for the energy conversion device connects to an inlet of the heat exchanger and wherein an outlet of the heat exchanger connects to an inlet of the cooling system of the energy conversion device.

13. The hybrid vehicle of claim 10, wherein a digital control unit is operatively connected to the first and second solenoid valves, the pressure sensor, and the energy conversion device, to selectively start the energy conversion device and allow the energy conversion device to consume fuel vapor and reduce fuel tank pressure.

14. The hybrid vehicle of claim 13, wherein the pressure sensor is connected to a signal bus and sends digital or analog signals to the digital control unit.

15. The hybrid vehicle of claim 13, wherein the butterfly valve is connected to the digital control unit, and wherein the digital control unit controls the butterfly valve through a solenoid actuator.

16. The hybrid vehicle of claim 15, wherein the digital control unit further comprises:
   a. a processor in communication with computer-readable media specially programmed with adequate interfaces to receive data signals from and send control signals to various components in the hybrid vehicle;
   b. machine executable instructions stored in the computer-readable media configured to instruct the processor to optimize the operation of the hybrid vehicle according to various criteria selected from the group consisting of energy efficiency, battery life, acceleration performance, emissions reduction, total cost of ownership;
wherein the digital control units receives digital or analog signals through the signal bus from the pressure sensor, and sends control signals through the signal bus to control the safety relief valve, the first and second solenoid valves, the energy conversion device, and the butterfly valve such that the software program controls each of the said elements.

17. A method of using the hybrid vehicle of claim 1, comprising the steps of:
   a. setting an upper pressure threshold for the buffer space in the fuel tank;
   b. starting the energy conversion device to consume fuel vapor in the buffer space, when the upper pressure threshold is exceeded;
   c. opening the first solenoid valve so that the first fuel vapor flows from the buffer space to the energy conversion device through the orifice plate and coil producing a cooling effect and reducing tank pressure;
   d. charging a battery of the hybrid vehicle with energy generated by the energy conversion device;
   e. closing the first solenoid valve and shutting down the energy conversion device when the pressure in the buffer space drops below a predetermined level.

18. A method of using the hybrid vehicle of claim 10, comprising the steps of:
   a. setting a lower pressure threshold for the buffer space;

b. controlling the butterfly valve to increase the flow rate of heat transfer fluid when the pressure in the buffer space drops below the lower pressure threshold, whereby incremental heat enters the tank, increases fuel evaporation in the tank and increases pressure in the buffer space.

19. The hybrid vehicle of claim 1, wherein the energy conversion device is a fuel cell and the liquefied fuel is selected from the group consisting of: hydrogen, methanol, and mixtures thereof.

* * * * *